Figure 1:
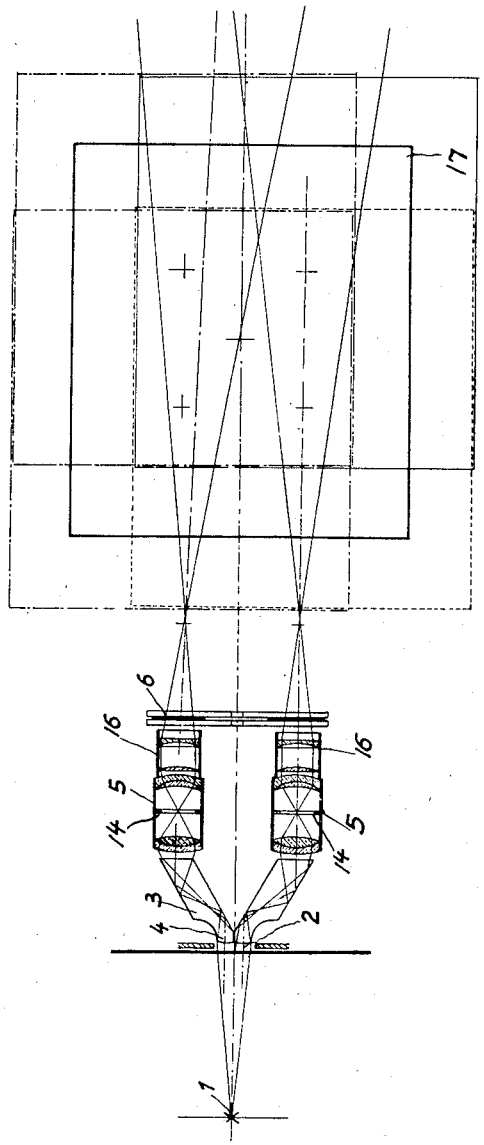

Patented Oct. 15, 1940

2,217,907

UNITED STATES PATENT OFFICE 2,217,907

APPARATUS FOR THE PROJECTION OF COLOR-VALUE IMAGES

Adolf H. Kämpfer, Berlin, and Albert Schattmann, Berlin-Charlottenburg, Germany

Application September 21, 1938, Serial No. 231,062
In Germany September 20, 1937

4 Claims. (Cl. 88—16.4)

This invention relates to an apparatus for the simultaneous projection and exact register on the projection screen of a group of color-value part-images accommodated within a normal cinematograph frame by the use of objectives of normal size. It is the object of the invention to provide improvements which on the one hand preclude loss of light and on the other hand facilitate focussing and exact register of the single images.

It has already been proposed to project the four part-images of an additive color film, which are accommodated within a normal cinematograph frame and have been recorded in non-parallactic fashion and with freedom from distortion, and to cause the same properly to register on the screen, by projecting them singly by means of a divided condensing lens and separate bundles of rays and deflecting each bundle of rays by means of single-ray objectives. In the grouping together of the four part-images, performed for reasons of economy, within the area of a normal cinematograph frame there is a decided drawback attendant on the fact that only small single-ray objectives can be employed for projecting and focussing the single images, as the spacing between the axes of the objectives may not exceed one-half of the height of the frame and the objectives, therefore, are thus limited in their diameter to a size which at the most is equal to one-half of the height of a normal frame. This small diameter of the objectives results in the fact that the corners and marginal portions of the image extending beyond the diameter of the objective are adversely affected in intensity, so that upon the projection of the part-images, owing to the small diameter, there is a considerable loss of light.

A disturbing factor has also been found to consist in the fact that a fine regulation of the single objectives, which are situated one against the other, can be performed only to a negligible degree, as any variation in the position of the single objectives even with the assistance of the finest adjustment means results of necessity in view of the small size of the objectives in a very large angle of deflection.

The problem thus arises of so projecting color-value part-images, which are accommodated within a normal cinematograph frame, for example three color-component images and a supplementary black-and-white image, that the focussing of the single part-images can take place by means of objectives of normal size.

It has already been proposed to facilitate the projection of additive color films of the kind in question, the part-images of which are disposed within a space equivalent to a normal cinematograph frame, by allowing the light of the light source to act on the film direct and passing the rays in their entirety to a collecting lens in the usual fashion, the rays then being separated according to their single color values by means of a divided condensing lens situated in front of the collecting lens. According, therefore, to this proposal the normal cinematograph frame having its four single part-images is projected as a whole in a normal projection apparatus, and in the path of enlargement of this projection the collected rays are divided by means of a specially disposed lens system into separate rays, which by means of single-ray objectives and color filters cause the four part-images to register on the screen.

The disadvantage of this arrangement resides in the fact that the requisite displacement of the central axes of the images by the simple enlargement by means of a collecting lens is only possible some considerable distance away from this lens. A projection apparatus designed for the reproduction of color films would accordingly require a forwardly disposed auxiliary apparatus of considerable length. For optical reasons it would also appear very difficult in an apparatus of this nature to obtain exactly parallel disposal of the axes.

It is known per se to obtain displacement of the image axis by a reflection of 90° by means of co-operating prisms. The essential disadvantage of this displacement resides in the fact that even with this form of separation of the rays a very considerable proportion of the light intensity is lost owing to incomplete reflection at the reflecting faces. In utilising an image-axis displacement of this character by means of two or more prisms in 90°-deflection the loss of light resulting from absorption and incomplete reflection must be added to the loss of light already incurred upon the recording of the film.

It is the object of the invention to provide an apparatus, by which the four completely identical part-images of equal size, comprising color-component and black-and-white images recorded simultaneously from the same point and accommodated within a normal cinematograph frame, can be made to register upon the reproduction without loss of light and with the possibility of a sensitive adjustment creating no difficulties in its accomplishment.

The invention avoids the necessity for optical systems calling for any appreciable amount of space, and provides an apparatus which, in compact form, employs in place of the usual normal lens system of a normal projection apparatus a forwardly disposed auxiliary apparatus which with readily adjustable normal objectives permits of exact selection, focussing and positioning of each single color-component image.

In the accomplishment of the said object the invention makes use of three fundamental means. The first of these is characterised by the fact that the full beam of light from the normal light source available, after passing the four part-images to be projected, is immediately taken over by a system comprising four single prisms, the one end of each prism being so directed towards the appertaining part-image that the distance between the image and the end of the prism is as short as possible. In this way the light transmitted by the single part-image is deflected with total reflection by the end of the prism situated in front of the image on to the objective of normal size pertaining to the part-image in question, through which objective the light is then passed and is projected on to the screen together with the three remaining bundles of light, so that it appears with approximately the total light intensity of the normal light source.

The second means is characterised by the fact that a condensing or reflecting system of any kind between the light source and the film is dispensed with, and in place thereof the end of each prism directed towards the film is designed in convex form, so that the total light transmitted by the part-images presented for projection and assumed in the present example to be four in number is taken over by the single prisms in concentrated form by reason of the convex ends of the said prisms, and with total reflection is conducted without loss of light to the objective pertaining to the particular part-image, with simultaneous adaptation of the size of the image to the size of the objective. In this way, since the color filters employed are responsible only for a practically negligible absorption, the complete light available from the light source is projected on to the screen, and the light intensity usual in the projection of a normal cinematograph picture is thus ensured.

A further disadvantage attendant heretofore on reproducing apparatus for additive color films, due to deflection of the rays by color waves of different length, is eliminated by the fact that the different wavelengths occurring upon the reproduction and their consequent deflection are counterbalanced by the provision of means in conjunction with the single-ray objectives for varying the spacial relation of the single elements of the lens system. In this way it is possible to avoid the light losses otherwise usual, which impair the light intensity of the complete image, and also the color fringes caused by the deflection. If desired, these adjustable objectives can also be furnished with regulable diaphragms in their interior, and in addition they are furnished for adaptation to the focal distances of different theatres with auxiliary lens systems comprising a combination of plano-convex and plano-concave lenses preferably disposed between the single ray objectives and the forwardly disposed color filters.

In this way there is provided an apparatus by which the simultaneous projection and the exact register on the screen of a group of color-component part-images accommodated within the area of a normal cinematograph frame, by the use of objectives of normal size for the single rays, is rendered possible by the fact that the rays from the part-images, which are subjected in common to the light of the light source, are divided immediately in front of the film by the co-operation of lenses and totally reflecting prisms into single bundles of rays corresponding to each color-component, and each bundle of rays is so displaced and enlarged that the displaced and enlarged bundles can be deflected and adjusted without loss of light by means of objectives of normal size which are not subject to mechanical obstruction.

Figure 2:
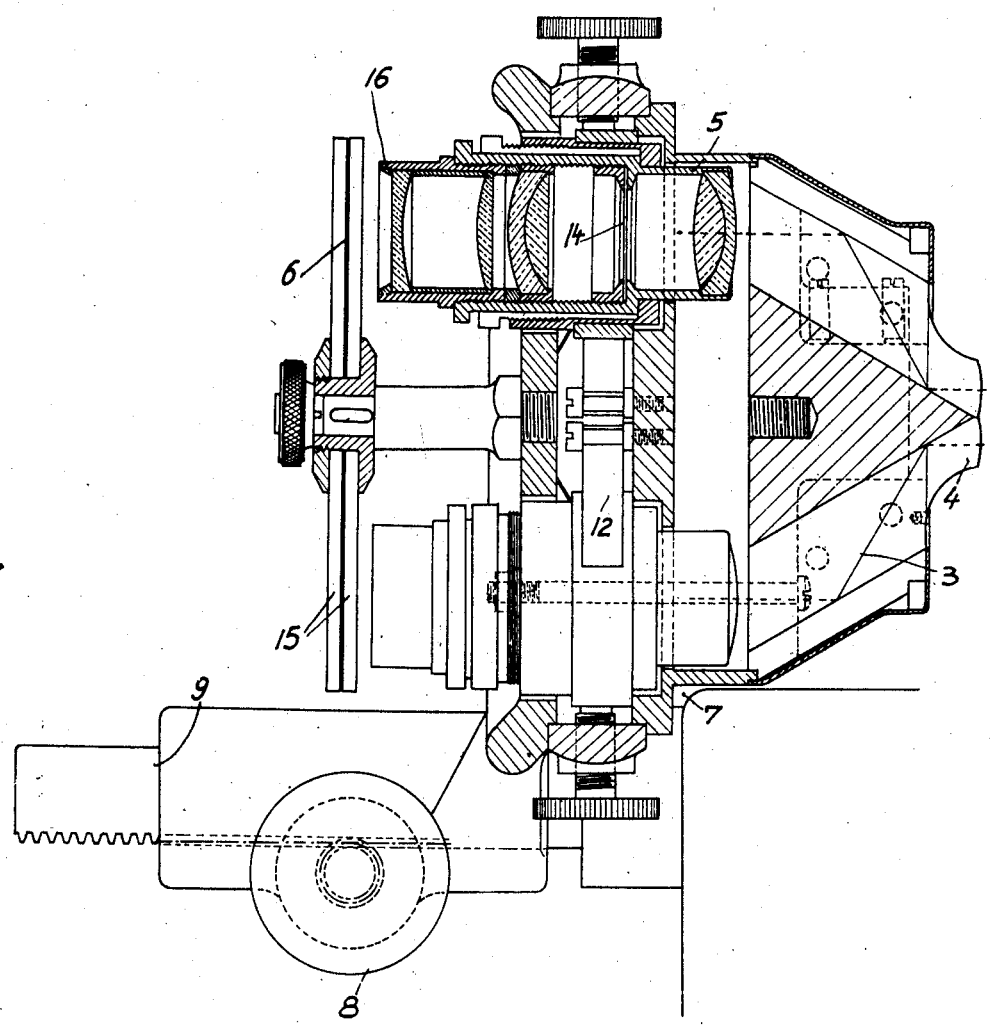
Figure 3:
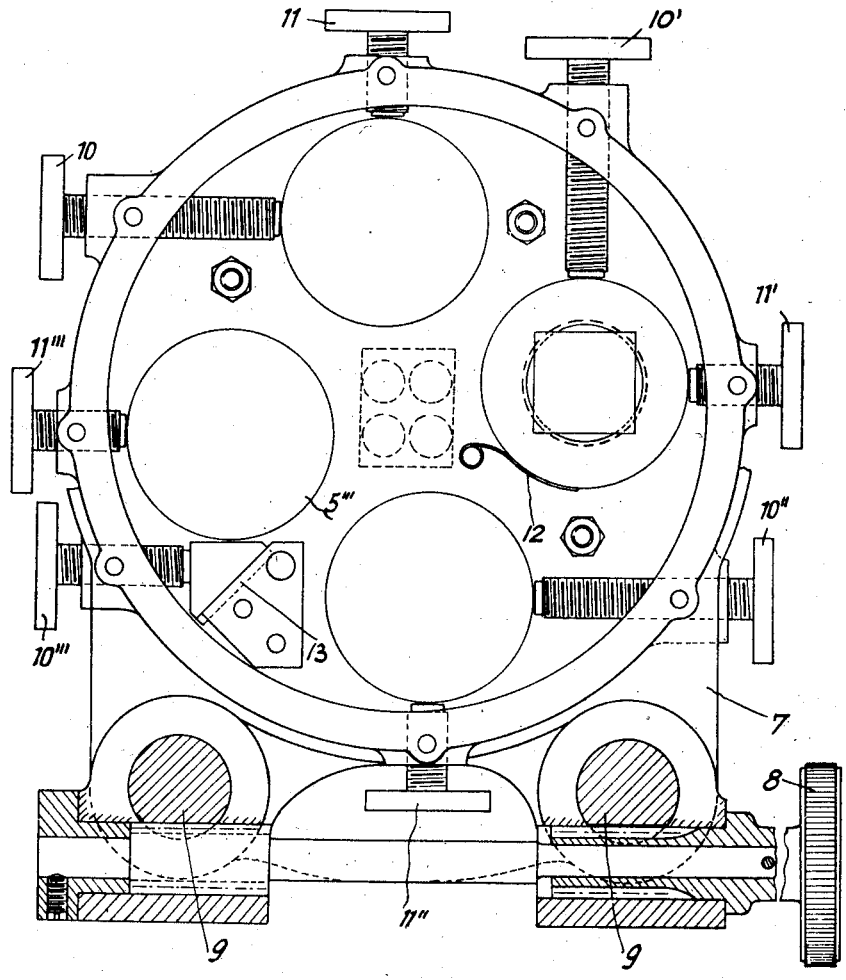

The invention will be described more fully with reference to the accompanying drawings, in which:

Fig. 1 is an optical diagram illustrating the method according to the invention, whilst Fig. 2 is a cross-section through the auxiliary system, and Fig. 3 is a front view of the said auxiliary system.

In the optical diagram according to Fig. 1 the light from the light source 1 is directed on to the normal cinematograph frame located in the image gate 2, this frame enclosing in the present case, for example, three color-component images red, green and blue, a black-and-white image and a sound strip.

Although in Fig. 1 the sound strip is shown at the side the invention is not varied by the provision of the sound record down the centre of the group of images. In this case the optical systems merely require to be spaced apart accordingly.

The bundle of rays passing through the complete group of color-value images and confined by the image gate 2 is received by four 60°-prisms 3, which are situated immediately in front of the image gate 2 and in the part that is not required for deflection of the rays and is directed towards the image gate are constricted for suitable limitation of the four prisms to the size of a normal cinematograph frame and are ground at this end to form convex lenses. In this way the complete bundle of rays at the image gate 2 is divided into single bundles of rays corresponding to the single color-component images, the convex lenses 4 producing a concentration and, upon the subsequent total reflection within the prism, a magnification, of such kind that at the end of the prism each bundle of rays practically fills out the complete cross-section of the prism. In front of the prisms there are provided objectives 5 of normal size having a diameter which is larger than the largest diameter of the bundle of rays leaving the prism. In this way there is prevented possible absorption of any part of the light leaving the prisms. This is of particular importance if for deflection of the single rays for the purpose of causing the four component images to register on the screen these objectives 5 are caused to be shifted parallel to the axis in front of the fixed ends of the prisms 3 by reason of a movability on all sides vertical to the axis of the rays.

By reason of this displacement parallel to the axis the rays, after leaving the objective and passing through a color filter in the conventional manner, are moved backwards and forwards over the screen until the four part-images have been made to register and all interfering color fringes have been caused to disappear. Within the objective there is provided in the conventional manner a diaphragm 14, by means of which, by regulation from the exterior, each color component can be made to act with greater or smaller effect. By auxiliary means 16 capable of being applied to the objectives and comprising a combination of plano-convex and plano-concave lenses normal objectives can be adapted to focal distances of theatres which are out of the usual.

In Figs. 2 and 3 there is shown an auxiliary apparatus designed according to the invention for application to normal cinematograph projectors. As well known, cinematograph apparatus of the standard type possess a guide, which in more recent models is provided in the form of two toothed racks 9, on which the normal objectives can be moved as desired. In place of these normal objectives there is provided on the rack 9 a casing 7, which by means of the screw 8 provides for approximate adjustment of the complete group of four objectives. In the casing 7, firmly mounted on a truncated pyramid, there are four prisms 3, which at 4 are constricted to conform to the area of a normal cinematograph frame and are each ground to form a convex lens. The objectives 5 of normal size are mounted to be movable in the casing 7 in such a manner that on the one hand they bear against the resilient support 12 whilst on the other hand they can be displaced by means of two adjustment screws, which are disposed vertically to one another and are staggered at 135° in relation to the resilient support. By means of this regulating device it is possible to move the objective 5 in front of the appertaining prism 3 parallel to the axis of the rays leaving the prism. The arrangement of the prisms 3 with respect to their lenses 4 and of the four single objectives 5 within the casing 7 is such that the prisms displace the rays of each bundle laterally out of the image in such fashion that the single objectives 5 are provided in approximately horizontal-vertical axial intersection, so that any mechanical obstruction of the objectives is avoided upon their displacement parallel to the axis and a certain circular symmetry is introduced into the auxiliary apparatus. Since owing to the provision of the carriage, which is located on the racks 9, it is impossible in the case of one of the objectives to provide the two adjustment screws 10''' and 11''' in the same fashion as in the adjustment means for the other objectives, the one of the screws 10''' is made to act on the appertaining objective 5''', not direct, but with the interposition of wedge faces 13.

The objectives 5 are furnished between their lens systems with an externally operable iris diaphragm 14. The arrangement is also such that for correcting the effect of the wavelength of the different color-values the distance between the objectives can be varied.

This adjustment, however, is made only upon the production of the auxiliary apparatus, so that there are no regulating members leading to the outside.

The objectives 5 include means adapted to receive any auxiliary objective which may be necessary, such auxiliary objective comprising a combination of plano-convex and plano-concave lenses for adaptation to focal distances in theatres which may be out of the ordinary. In front of the movable lenses, mounted to be exchangeable on a cross-piece on the casing 7, there are provided the set of color filters 6, which are preferably disposed between plano-parallel sheets of glass 15. It has been found desirable to employ uniformly graduated sets of color filters, which in their uniform graduation to one another are standardised in relation to the density of the film, and in consequence uniform sets of filters for the purpose of replacement can be held in reserve between the plano-parallel sheets of glass.

In Fig. 1 the numeral 17 represents the screen on which all four of the picture images are collected and are brought into register one with the other, the four pictures in complete register representing the complete cinematographic picture. While the lens system is shown in longitudinal section, the other parts of the figure are diagrammatically shown and the screen is illustrated as being turned to a position at right angles to the axes of the light beams and the lenses to clearly illustrate the arrangement of the pictures thereon.

What we claim as new and desire to secure by Letters Patent is:

1. In an apparatus for the simultaneous projection and exact register on a projection screen of a group of color-value part-images accommodated within a normal cinematograph frame, a light source, an image gate in which the group of part-images are subjected in common to the light from the said light source, a guide disposed forwardly of the said image gate, a casing mounted to be movable on the said guide, screws for moving the said casing, prisms on the side of the said casing directed towards the said image gate in a number corresponding to the number of part-images, the ends of the said prisms directed towards the said image gate being designed to form convex lenses grouped together within the area of a normal cinematograph frame, and the axes of the said prisms coinciding with the centres of the said part-images, an objective of normal size for each of the said prisms within the said casing, regulable diaphragms in association with the said objectives, a resilient support for the said objectives within the said casing, screws for shifting the said objectives on all sides in planes vertical to the passage of the rays, and a filter disposed in front of each objective corresponding to the color-component of the particular part-image.

2. An apparatus as claimed in claim 1, wherein each of the said objectives is adjustable in its spacing from the appertaining lens for the purpose of counteracting any effect exerted on the focal distance by the wavelength of the color component.

3. In an apparatus as claimed in claim 1, an auxiliary objective comprising plano-concave and plano-convex lens systems disposed between the said first objectives and the said filters for the purpose of adaptation to a particular focal distance.

4. In an apparatus for the simultaneous projection and exact register on a projection screen of a group of three or more color-value part-images accommodated within a normal size cinematograph frame, a light source, an image gate in which the group of part-images are subjected in common to the light from the said light source, a combined totally reflecting prism and convex lens for each part-image of the group, each lens being arranged immediately in front of the said image gate, an objective of normal size for each prism, each objective being shiftable on all sides for deflection of the bundle of rays in a plane perpendicular to the axis of the said rays, the said prism conducting the bundle of rays to the said objective with displacement parallel to the axis and with simultaneous enlargement, a filter disposed in front of the said objective corresponding to the color-component of the particular part-image, and the said prisms being designed as 60° prisms and each being constricted in the end nearest the frame to a size approximately equal to the size of a single part-image, the end of each prism directed toward the part-images on the film being designed to constitute the said lens.

ADOLF H. KÄMPFER.
ALBERT SCHATTMANN.